J. MOREHEAD.
WIRE STRETCHER.
APPLICATION FILED APR. 7, 1909.
942,006.
Patented Nov. 30, 1909.
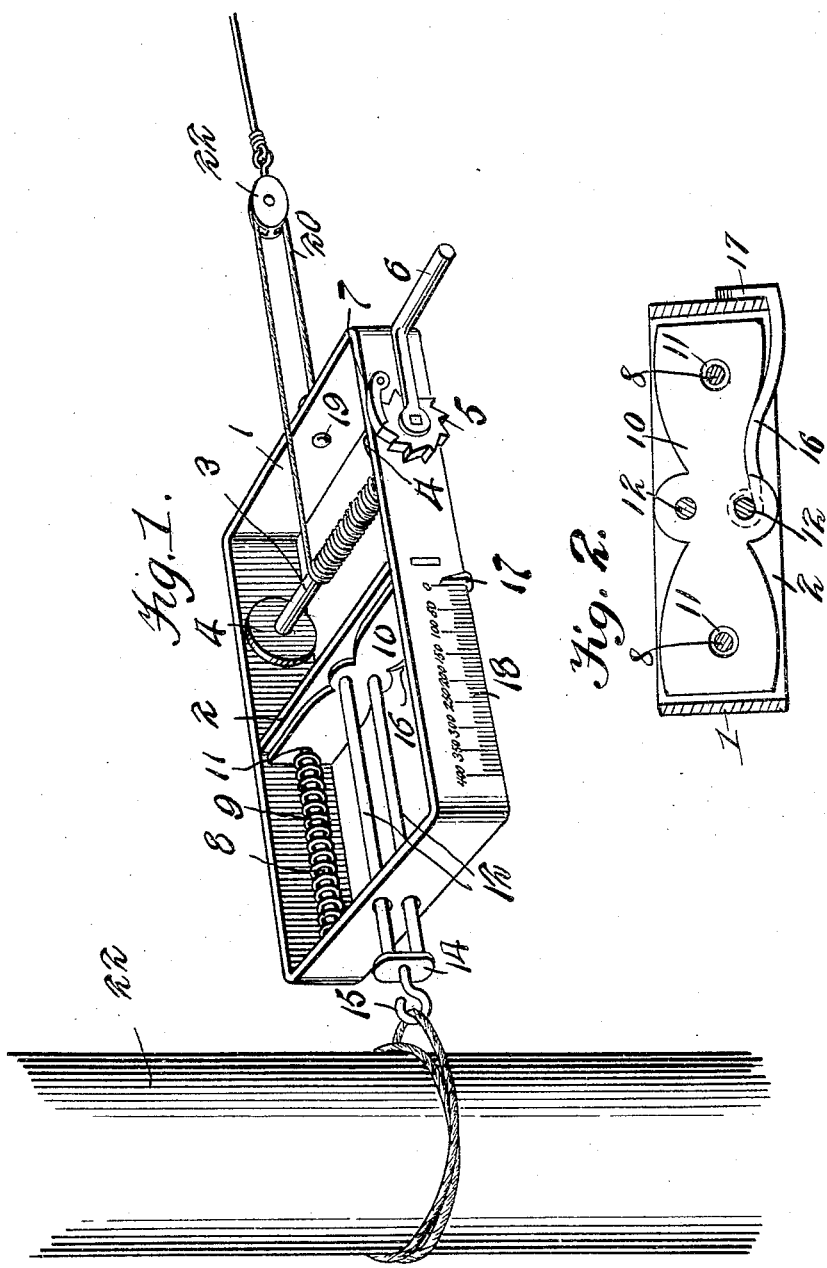
Witnesses
Inventor
John Morehead
By Victor J. Evans
Attorney

UNITED STATES PATENT OFFICE.

JOHN MOREHEAD, OF NEW PLYMOUTH, OHIO.

WIRE-STRETCHER.

942,006.

Specification of Letters Patent.

Patented Nov. 30, 1909.

Application filed April 7, 1909. Serial No. 488,397.

*To all whom it may concern:*

Be it known that I, JOHN MOREHEAD, a citizen of the United States of America, residing at New Plymouth, in the county of Vinton and State of Ohio, have invented new and useful Improvements in Wire-Stretchers, of which the following is a specification.

This invention relates to wire stretchers, and one of the principal objects of the same is to provide simple, reliable and efficient means for stretching fence wires and to indicate the strain being applied to the wire.

Another object of the invention is to provide a wire stretcher comprising a frame, a winding drum and a spring scale to indicate the tensile strain exerted upon the wire, thus providing means whereby the strain may be equalized or rendered uniform from one end to the other of a fence.

These and other objects may be attained by means of the construction illustrated in the accompanying drawings, in which,—

Figure 1 is a perspective view of a wire stretcher made in accordance with my invention, and shown in position for use. Fig. 2 is a transverse section of the same.

Referring to the drawing, the numeral 1 designates a rectangular frame provided with a cross bar 2 secured at its ends to the frame 1. Journaled near one end of the frame is a winding drum comprising a shaft 3 provided with end disks 4. The shaft 3 extends through the frame at one end, and secured to said end is a ratchet wheel 5. Fitted to the squared outer end is a crank 6. A pawl 7 is pivoted to the frame 1, said pawl engaging the teeth of the ratchet wheel 5.

The cross bar 2 is braced from one end of the frame 1 by means of rods 8, said rods bearing at one end against the end of the frame 1 and at their other ends being headed up against the cross bar 2. Spiral springs 9 surround the rods 8, and a sliding bar 10 is provided with openings 11 through which the rods 8 extend. Connected to the bar 10 is a pair of pull rods 12, said rods being headed up against the bar 10, and the outer ends of said rods being connected to a plate 14 provided with a hook 15 disposed between the rods 12 and connected to said plate 14. The rods 12 extend freely through openings in the end of the frame 1.

Carried by the bar 10 is an arm 16, the outer end of which is turned up to form a pointer 17 which traverses the outer side of the frame 1 when the stretcher is in use. Upon the outer side of the frame 1 is a scale 18 over which the pointer 17 moves, and the scale 18 is provided with suitable numbers to indicate the strain being exerted upon the line wires of the fence. At one end of the frame 1 is a suitable loop 19, and connected to said loop is a rope or cable 20, said rope passing around a pulley 21, and connected to said pulley is one of the line wires of the fence, said rope or cable 20 extending from the pulley back to the winding drum, as shown in Fig. 1.

The operation of my invention may be briefly described as follows: The line wires of a fence or a series of the line wires connected to a suitable clamp may be attached to the pulley 21. By turning the crank 6 the line wires are equally pulled toward the anchor post 22, and as the strain is being exerted upon the line wires the pointer 17 will move over the scale 18 to indicate the strain being exerted. In order that the fence wires may all be uniformly stretched the pointer 17 will indicate the strain by means of the scale 18.

From the foregoing it will be obvious that a wire stretcher made in accordance with my invention is simple in construction, is reliable and efficient in use, will indicate the tensile strain given to the fence wires, and in this way a uniform fence may be constructed.

I claim:—

The herein described wire stretcher comprising a rectangular frame, a winding drum journaled transversely of said frame near one end thereof, said winding drum comprising a shaft, a ratchet wheel on the shaft outside the frame, a crank mounted on the end of said shaft, and a pawl for engaging said ratchet wheel, a cross bar connected centrally to the frame, a sliding frame comprising a second cross bar, rods extending through said second cross bar, springs surrounding said rods and bearing at one end against said frame, a pointer connected to said second cross bar and extending underneath the frame, a graduated scale on said frame, pull rods extending through said frame, and a rope or cable connected to said drum at one end and at the other end to said frame, said cable passing around a pulley.

In testimony whereof I affix my signature in presence of two witnesses.

JOHN MOREHEAD.

Witnesses:
MARCUS PECK,
HARLEY PECK.